UNITED STATES PATENT OFFICE.

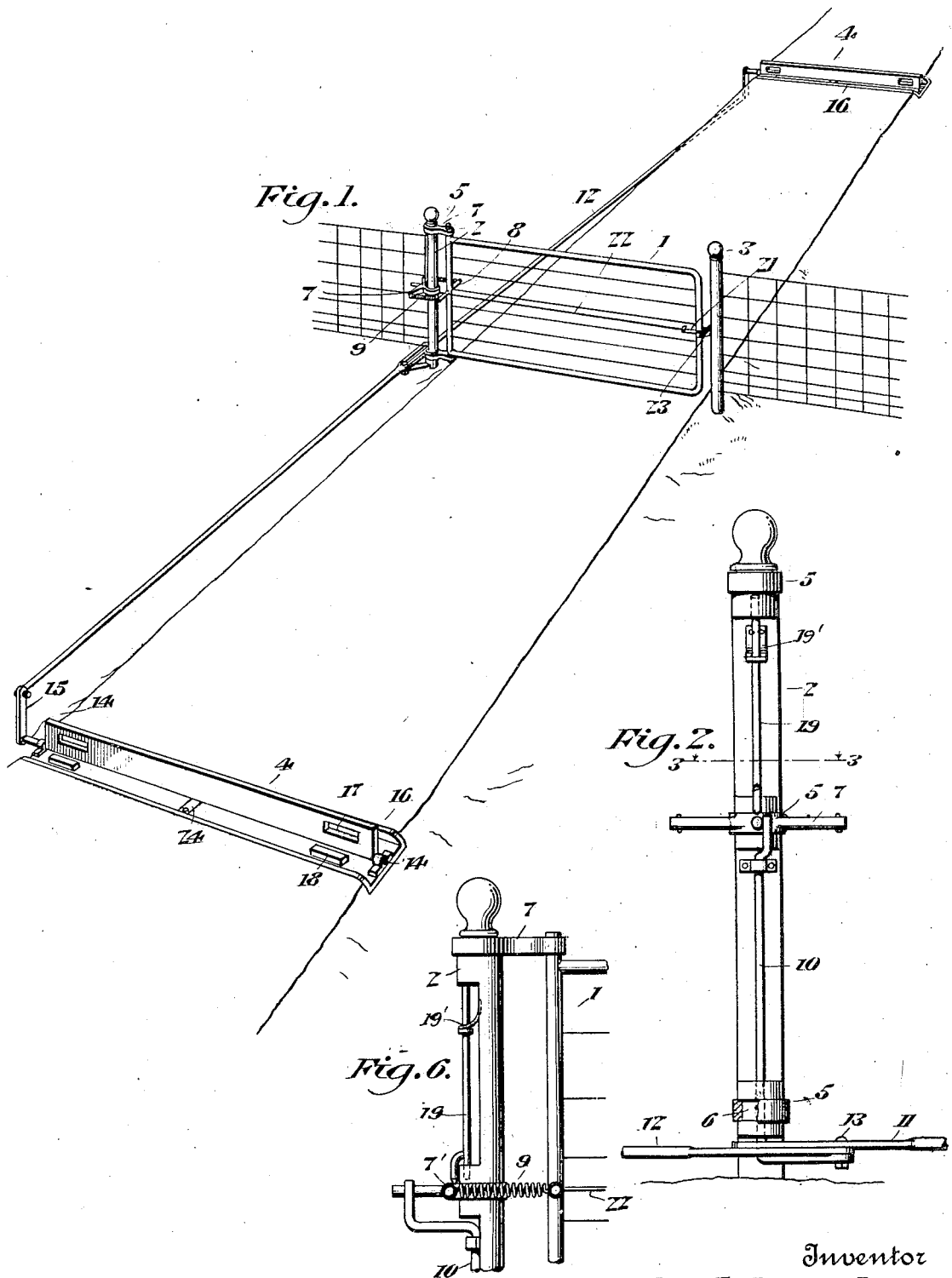

JOHN WEREZAK, OF ST. JULIEN, SASKATCHEWAN, CANADA.

GATE.

1,297,949.　　　　Specification of Letters Patent.　　Patented Mar. 18, 1919.

Application filed November 4, 1918.　Serial No. 261,050.　REISSUED

*To all whom it may concern:*

Be it known that I, JOHN WEREZAK, a subject of the King of Great Britain, residing at St. Julien, in the Province of Saskatchewan and Dominion of Canada, have invented new and useful Improvements in Gates, of which the following is a specification.

This invention relates to new and useful improvements in gates and the principal object of the invention is to provide means for actuating the gate by a vehicle.

Another object of the invention is to provide automatic means for latching and unlatching the gate and also to provide a novel arrangement of parts for hinging the gate to the gate post.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of the gate and its operating parts.

Fig. 2 is a rear view of the gate post.

Fig. 6 is an enlarged side view of part of the gate post and gate and their associated parts.

Figure 3:
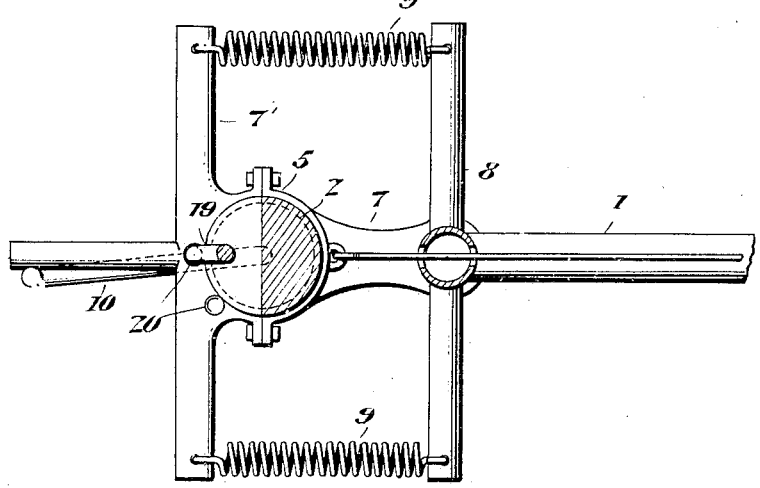
Fig. 3 is a cross section on line 3—3 of Fig. 2.
Figure 4:
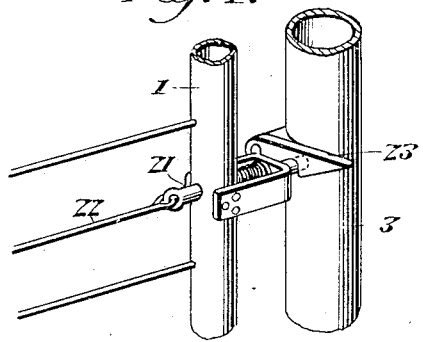
Fig. 4 is a detail view of the latching means.
Figure 5:
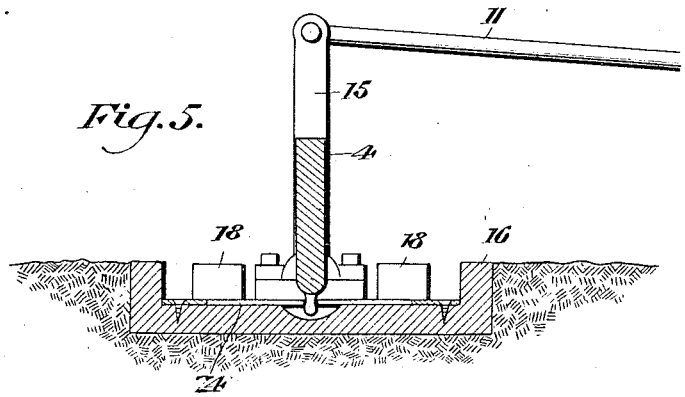
Fig. 5 is a detail sectional view through one of the vehicle actuated devices.

As shown in these views the invention includes a gate 1 provided with hinging means for securing it to the post 2 and with latching means for connecting it with the post 3. The gate is opened and closed by means of pivoted members 4 located on the road and adapted to be struck by the vehicle.

I prefer to make the hinges of the gate of ring shape as shown at 5, said rings engaging circular grooves 6 formed in the gate post 2. Each ring is provided with an extended part 7' which engages with the rear end of the gate. As shown in the drawings, the gate is supported by an upper and lower ring and a central ring. This central ring is provided with a yoke 7' instead of the extended part 7 and a cross piece 8 is connected with the central part of the end of the gate. This cross piece is connected to the ends of the yoke 7' by coil springs 9. 10 is a cranked rod suitably journaled on the post and having the crank at its upper end adapted to engage with the yoke 7'. The lower end of the rod is also cranked and this cranked end engages with the slotted ends of a pair of horizontal rods 11 and 12. The cranked end may be provided with a pin 13 which enters the slots in said rods. The rods extend in opposite directions, and each rod is connected to one of the vehicle operated members 4 so that the movement of said member will force the cranked rod against the yoke and through the springs and cross piece will swing the gate to open and closed position according to which direction the pivoted members are moved.

Each of the pivoted members 4 is provided with a pair of trunnions 14 suitably journaled in a part placed along the road. One of the trunnions is extended and receives an arm 15 to which the end of the rod is connected. As will be seen one of the arms extends downwardly while the other extends upwardly so as to move the gate in opposite directions.

I prefer to place each member in a trough 16 extending across the road and the journals for the trunnions may be secured to the bottom of said trough. I prefer to form slots 17 in said members which engage blocks 18 placed in the bottom of the trough, when the member is in its lowermost position.

I find it desirable to use a forked member 19 to prevent the springs 9 from closing the gate before the vehicle has passed therethrough or from moving the gate from a shut position. This member has its upper end slidingly held in a hole in the upper part of the post and its lower end forked. One fork engages a hole in the central part of the post and the other fork is adapted to engage one of a pair of holes 20 in the yoke, according to the position of the gate. In this way the gate is held open until the vehicle strikes the far member 16 and when closed said member will prevent the springs 9 from opening the gate. The forked member 19 is normally held in engagement with the holes by a suitable spring 19'.

The latch means for the gate consists of a spring controlled bolt 21 carried by the front end bar of the gate and connected with the central ring by means of a flexible connection 22 in such a manner that when the said ring is turned the connection will be pulled so as to withdraw the bolt from the keeper 23 on the post 3.

It will thus be seen that when a vehicle moving toward the gate strikes the first member 4 said member will be moved downwardly into the trough. The blocks will prevent jolting of the vehicle as it passes over said trough. The movement of the arm 15 connected with said member will move the horizontal rod so as to operate the crank, which will swing the yoke to open the gate. As the vehicle passes through the gate opening and comes in contact with the other pivoted member it will swing this member downwardly into the trough and thus close the gate.

Due to the slots in the ends of the rods 11 and 12 the cranked rod may be moved by one rod without interference on the part of the other rod.

I place springs 24 in the troughs to engage with the pivoted members to hold said members normally in raised position. By this means the said member will be returned to normal position as soon as the vehicle has passed the same, but this return movement will not move the cranked rod on account of the slot in the connecting rod.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a gate post, a gate hinged thereto, a movable member on the gate post, springs connecting said member with said gate, a cranked rod having one end engaging with said movable member, a pivoted member on each side of the gate and adapted to be struck by a vehicle and rods connecting said members with the cranked rod.

2. A device of the class described comprising a gate, a gate post, rings engaging the post and connected with the gate, a centrally located ring on the post, a yoke connected therewith, a cross piece on the gate, springs connecting the ends of said cross piece and yoke together, means for attaching said yoke to one of said rings, a rod having a crank at each end, the uppermost crank engaging the yoke, a pivoted member on each side of the gate and slotted rods connecting said members with the lower cranked end of the rod.

3. A device of the class described comprising a gate post, a gate hinged thereto, an arm carried by the rear part of the gate, a yoke movably mounted on the post, springs connecting the yoke with the arm, friction means engaging with the yoke for holding the same against the action of the springs and means for actuating the yoke.

In testimony whereof I affix my signature.

JOHN WEREZAK.